United States Patent [19]

Uchida et al.

[11] 4,183,990

[45] Jan. 15, 1980

[54] STEP TABLET

[75] Inventors: Toshio Uchida; Yorimiti Yabuta; Hiroshi Noguchi; Eiichi Hasegawa; Teppei Ikeda, all of Asaka, Japan

[73] Assignee: Fuji Photo Film Co., Ltd., Minami-ashigara, Japan

[21] Appl. No.: 853,794

[22] Filed: Nov. 21, 1977

[30] Foreign Application Priority Data

Nov. 22, 1976 [JP] Japan ................................ 51-140963

[51] Int. Cl.2 ........................... B32B 7/02; G03C 5/04

[52] U.S. Cl. .................................... 428/212; 96/27 R; 96/28; 96/67; 428/913

[58] Field of Search .................... 428/212, 913; 96/67, 96/28, 27 R

[56] References Cited

U.S. PATENT DOCUMENTS

| | | | |
|---|---|---|---|
| 3,162,533 | 12/1964 | Pelsmaker et al. | 96/74 X |
| 3,353,955 | 11/1967 | Colgrove | 96/28 |
| 3,690,881 | 9/1972 | King | 96/27 R |
| 3,770,438 | 11/1973 | Celeste | 96/67 |

*Primary Examiner*—Thomas J. Herbert, Jr.

*Attorney, Agent, or Firm*—Sughrue, Rothwell, Mion, Zinn and Macpeak

[57] ABSTRACT

A step tablet in which density steps of a definite shape, each density step having a specific optical density, form a series of decreasing or increasing densities, in which any two density steps contiguous to each other are disposed with a boundary space of a specific shape between the density steps.

36 Claims, 10 Drawing Figures

STEP TABLET

BACKGROUND OF THE INVENTION

1. Field of the Invention

The present invention relates to a step tablet for determining the optimum degree of exposure of photosensitive materials and, in particular it relates to an improved step tablet useful for determining the optimum degree of exposure of peel-apart (delamination) type photosensitive materials more accurately than conventional step tablets.

2. Description of the Prior Art

In a conventional image forming process using a material called a "photosensitive resin" or a "photopolymerizable resin", a wet process is employed utilizing the property of the photosensitive resin in which the photosensitive resin which is originally soluble in a solvent becomes insoluble in the solvent upon light exposure, that is, a solution of the photosensitive resin is coated on a support for image formation, such as a metal plate, etc., followed by drying and after exposing the coated layer through an original to actinic radiation, the coated layer is dissolved off at the unexposed areas only using a solvent which dissolves the coated layer at the unexposed areas but does not dissolve the coated layer at the exposed areas, or, in another embodiment, a photosensitive sheet composed of the photosensitive resin is laminated on the surface of a support for image formation and then the laminated layer is exposed and developed as in the above-described process.

The image forming process as described above involves difficulties in that a large amount of solvent is required for the development and also a long period of time is required for finishing the development. Therefore, to overcome the technical, economic, and hygienic disadvantages in the above-described process, a dry developing process wherein a peel-apart development type photosensitive material comprising a support having laminated thereto a photosensitive layer and a peelable film (i.e., a flexible film which can be separated by peeling off) is exposed through an original to actinic radiation and then the peelable film is separated from the laminated assembly by peeling apart to form an image without using any solvent.

Examples of peel-apart development type photosensitive materials are described in, for example, Japanese Patent Publication Nos. 9663/'63 and 15,932/'66; and U.S. Pat. Nos. 3,353,955 and 3,770,438. For example, in the technique disclosed in Japanese Patent Publication No. 9663/'63, a photosensitive material comprising a support such as a metal sheet, a paper, a synthetic resin film, etc., as the lowermost layer, a film (corresponding to a peelable film) as the uppermost layer, and, as an interlayer between the support and the peelable film, a photosensitive layer, composed of a material in which the bonding strength to the peelable film is higher than that to the support but the bonding strength to the support, when the material is exposed to actinic radiation, becomes higher than that to the peelable film, is exposed through an original to actinic radiation and then the peelable film is separated by peeling apart to leave wholly or partially the unexposed portions of the photosensitive layer adhered to the peelable film and the exposed portions of the photosensitive layer adhered to the support. The above-described technical principle may also be utilized in a reverse manner.

The dry development process using such a peel-apart development system is markedly superior to the above-described wet development process from the standpoint that the development procedure is simple and further since an organic solvent, an aqueous solution, etc., are not used in the dry process, the possibility that dangerous accidents will occur and the necessity for processing waste solutions to avoid environmental pollution are both eliminated. In practice, the dry development process has been employed for making printed electric circuits using a material composed of a metallic layer formed on an electrically insulating material or for making lithographic printing plates using surface-treated aluminum sheets, etc., as the support plate.

To determine the degree of exposure or the optimum exposure time (i.e., the optimum exposure amount to be applied determined from the results of exposure and development) of an image-forming material for the wet development process, a step tablet, for example, Kodak Step Tablet No. 3 (made by Eastman Kodak Co.) is contact-printed on a presensitized plate and in this case, the optimum degree of exposure or amount of exposure for the photosensitive material is determined by the amount such that the part of the photosensitive layer of the pre-sensitized plate corresponding to the 0.9 density step, i.e., the sixth step of the step tablet from the lower density side, forms a solid black image.

However, when such a conventional method using a step tablet is applied to a peel-apart development type photosensitive material for determining the optimum degree of exposure, the following difficulties are encountered.

(1) The position of the density step forming an all-over image differs depending on the direction in which the peelable film of the photosensitive material is peeled apart at development by peeling.

(2) When the peelable film of the photosensitive material is peeled apart from the lower density portion of the step tablet toward the higher density portion, two or more density steps appear as a solid black image, which results in it being impossible to determine accurately the optimum degree of exposure.

To overcome the above-described difficulty (1), establishing a definite peeling direction for the photosensitive material could be considered but such an attempt involves considerable inconvenience in the working procedures. Also, since the degree of exposure must be determined by the number of the density steps forming the all-over image which appear inaccurately as in the above-described difficulty (2), it is difficult in this case, also, to determine accurately the optimum degree of exposure for the photosensitive material.

SUMMARY OF THE INVENTION

As the result of various investigations on overcoming the above-described difficulties, it has now been discovered that the optimum degree of exposure of photosensitive materials can be determined accurately using a step tablet by forming a boundary space having a specific optical density between optional density steps of the step tablet contiguous to each other.

It has further been found that the step tablet of this invention can be employed, as a matter of course, for determining the degree of exposure of conventional silver halide photographic materials, photosensitive printing plates (presensitized plates), and photoresists and, in particular, can be employed very effectively for determining the optimum degree of exposure of peel-apart development type photosensitive materials which recently have been very actively developed.

An object of this invention is to provide a step tablet capable of being used to accurately determine the optimum degree of exposure of a peel-part development type photosensitive material comprising at least a support, a photosensitive composition layer thereon and a peelable film thereon with which images are formed by utilizing the difference in the adhesive strength to the support between the unexposed portions and the exposed portions of the layer of the photosensitive composition used for the photosensitive material.

Another object of this invention is to provide a step tablet capable of being used to determine visually and very simply the accurate degree of exposure of photosensitive materials without the need for any specific tools and equipment.

A further object of this invention is to provide a step tablet which is applicable for use with many kinds of photosensitive materials comprising various kinds of photosensitive materials (or systems) and which can be used to determine accurately the optimum degree of exposure of these photosensitive materials.

These and other objects of this invention will become apparent from the following descriptions.

Thus, the present invention provides a step tablet in which areas of a specific shape, each having a specific optical density, that is, the density areas each surrounded by a contour of a specific shape and each having a specific optical density (hereinafter, referred to as optical density steps) are arranged in a specific order, this specific order being such that the optical density progressively increases from the lowest density optical density step to the highest density optical density step, or progressively decreases from the highest density optical density step to the lowest density optical density step, or further progressively changes in an appropriate order for determining the accurate degree of exposure, in which a boundary space of a specific shape is disposed between two optical density steps contiguous to each other.

In specific embodiments of this invention, the boundary space formed between the optical density steps is linear and has a definite width, the boundary space is disposed around the entire periphery of each optical density step, the shape of each optical density step is circular, elliptical or rectangular, the area of the boundary space is not transparent to actinic radiation, the optical density of the area of the boundary space is higher than the highest optical density of any step of the step tablet, each of the optical density steps or a portion of the optical density steps have at least one indicator mark which is not transparent to actinic radiation, the boundary space between the steps is transparent to actinic radiation, the optical density of the area of the boundary space is lower than that of any step of the step tablet, each of the optical density steps or a portion of the optical density steps have at least one indicator mark which is transparent to actinic radiation, and the boundary space comprises an actinic radiation transparent portion and an actinic radiation non-transparent portion, these two portions each contacting two optical density steps.

DESCRIPTION OF THE PREFERRED EMBODIMENTS

In other words, the invention provides a transmission type step tablet having a step like wedge constant of optical density, in which a boundary space of a specific optical density is formed between at least two density steps contiguous to each other.

That is, in a step tablet for determining the degree of exposure of photosensitive materials, a portion which is not transparent to actinic radiation is formed at the boundary of the two density steps contiguous to each other or at the periphery of each density step for a negative-type step tablet and an portion transparent to actinic radiation is formed as above for a positive type step tablet.

Now, the invention will be described in detail by referring to the accompanying drawings.

Figure 1:
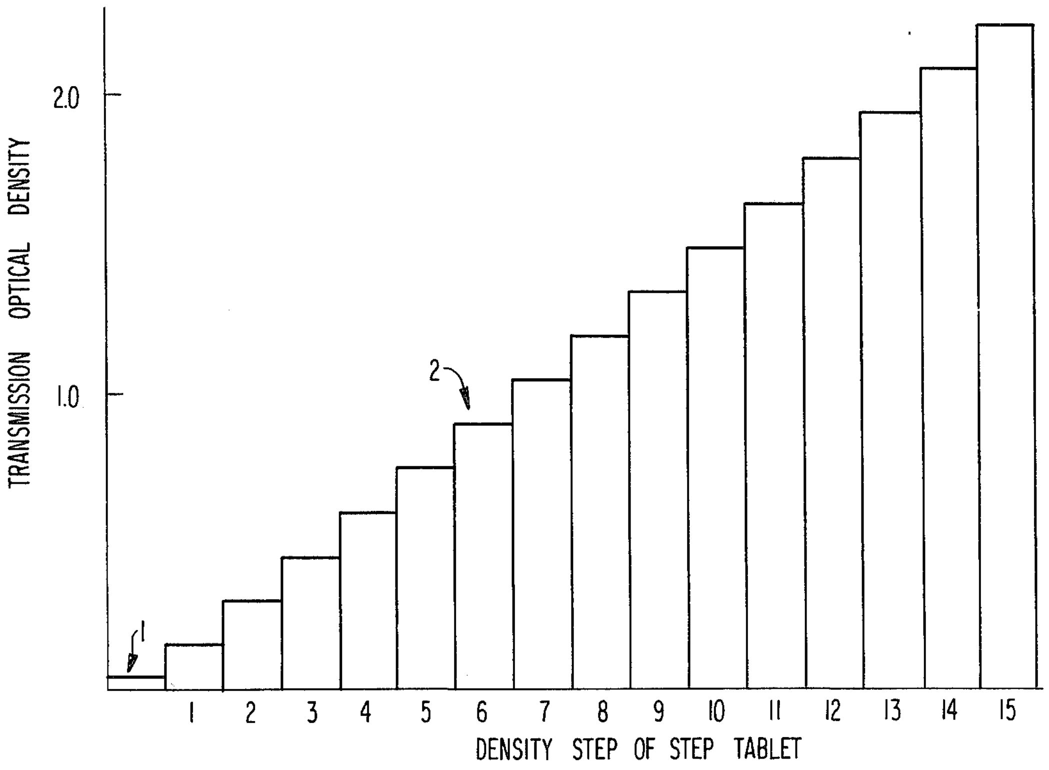
FIG. 1 shows the number of the optical steps of a step tablet conventionally used and the distribution of the transmission optical densities corresponding to the density steps where the reference numeral 1 indicates the optical density of the transparent support and reference numeral 2 indicates the step optical density of the step tablet.

A conventional step tablet which has hitherto been generally used has an optical density diagram for the optical density steps thereof as shown in FIG. 1. In step wedges (or tablets) of this type, the wedge constant (i.e., the difference in optical density between the steps) ranges from 0.1 to 0.3, the maximum optical density ranges from 3.0 to 4.0, and the number of steps ranges from 15 to 20.

Figure 2:
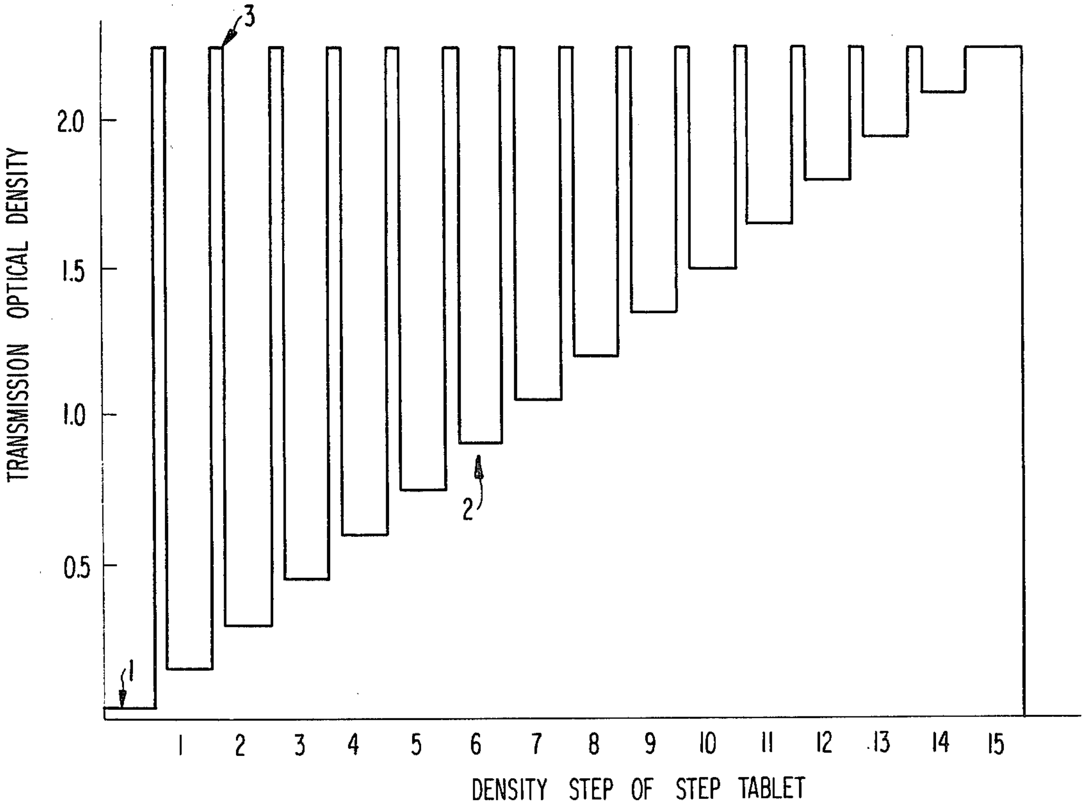
FIG. 2 shows the optical density distribution of a negative-type step tablet of this invention, wherein reference numerals 1 and 2 have the same meaning as in FIG. 1 and the opaque portions or the boundary spaces formed between the density steps are shown by the reference numeral 3.

In one embodiment of the invention, that is, in a negative-type step tablet of this invention, the diagram of the optical density thereof is as shown in FIG. 2, that is, a spaced boundary of a specific optical density is formed between adjacent optical densities of the optical steps by forming portions which are not transparent to actinic radiation around each optical density step. By forming the spaced boundary of a specific optical density between adjacent optical densities of the optical steps, the above-described difficulties encountered in the prior art in the case of using peel-apart development type photosensitive materials can be overcome.

That is, since in the step of development by peeling, the upper peelable film or layer is separated by peeling to form images due to the difference in adhesion of the photosensitive composition, if a step exposure using a step wedge such as a step tablet is employed, sometimes, depending on the peeling direction the formation of images is influenced by the optical density step adjacent thereto and hence the portions removed by peeling do not accurately correspond to the photochemical change which occurs. On the other hand, by forming a shaded space boundary having a specific optical density (an optical density having sufficient shading, i.e., an optical density higher than about 1.5, preferably higher than about 1.8) between any two adjacent density steps, the influence of the density step disposed at the portion previously peeled at development by peeling can be removed, which results in providing the accurate number of a solid black image. The above described phenomenon has only now been found in this invention.

As such a step tablet, a step tablet having the optical density diagram as shown in FIG. 2 may be produced or the step tablet of this invention may also be produced by placing an material or strip which is not transparent to actinic radiation such as a black paper, a light-shielding tape, etc., having apetures in such a way that the light-shielding strip covers only the boundary portions of the density steps on the conventional step tablet as shown in FIG. 1. Furthermore, to facilitate the discrimination of each optical density step, a light-shielding index mark (for example, a numeral, an alphabetical character, etc.,) may be formed on each optical density step and such an approach is preferred. The term light-shielding as used herein means that less than about 0.1% of the actinic radiation is passed or transmitted.

In addition, in the diagrams shown in FIG. 1 and FIG. 2, reference numeral 1 indicates the optical density of the transparent support (the optical density of fog) and reference numeral 2 indicates the step optical density of the step tablet. Also, reference numeral 3 in the diagram shown in FIG. 2 indicates the optical density of the non-transparent or opaque portion of the step tablet for negative working photosensitive materials.

Figure 4:
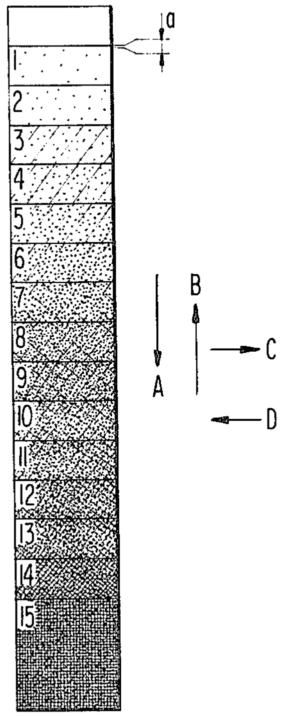
FIG. 4 is a planar view of an embodiment of a negative-type step tablet of this invention.

Furthermore, an embodiment of the negative type step tablet having the optical density as shown in FIG. 1 is shown in FIG. 4.

Figure 3:
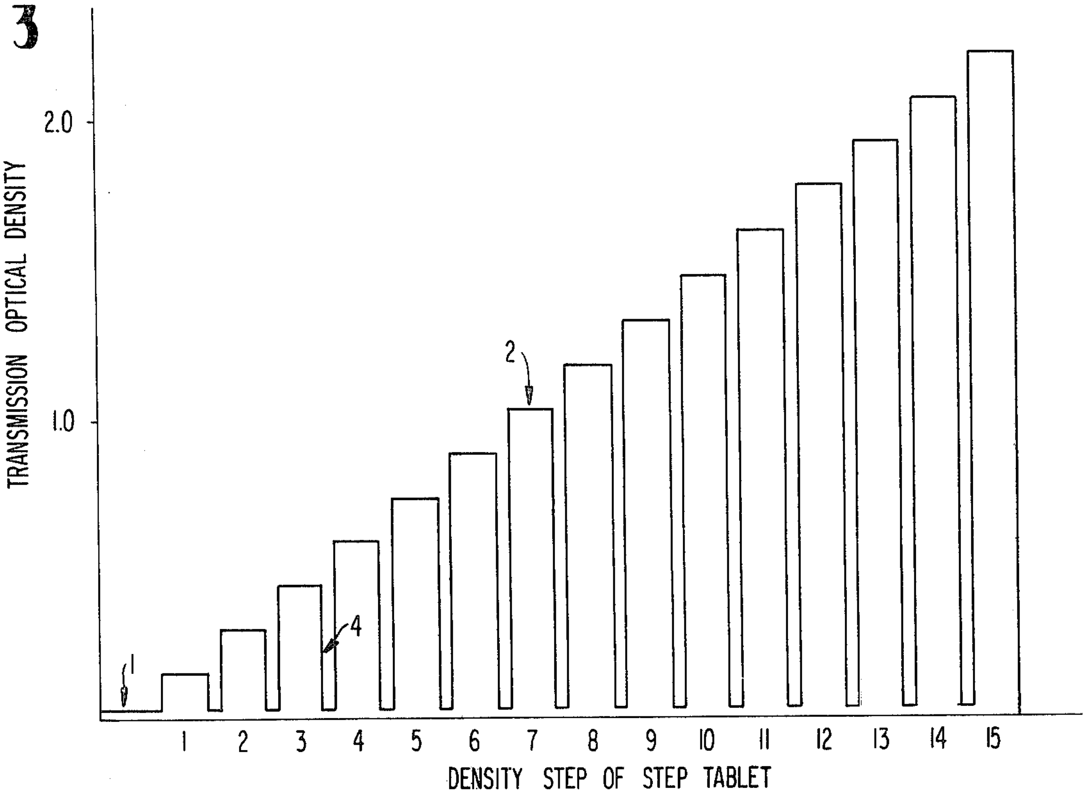
FIG. 3 shows the optical density distribution of a positive-type step tablet of this invention.

In the positive type step tablet of this invention, the boundary portion of each density step is in an inverse relationship with that of the above-described negative type step table of this invention in the optical density mode as illustrated in FIG. 3. In this case also, an indicator mark may be formed on each optical density step as was the case for the negative type step tablet and it is preferred that the indicator mark be transparent to actinic radiation. In the diagram shown in FIG. 4, numeral 4 indicates the optical density of the transparent portion of the step tablet for positive working photosensitive materials.

Figure 5:
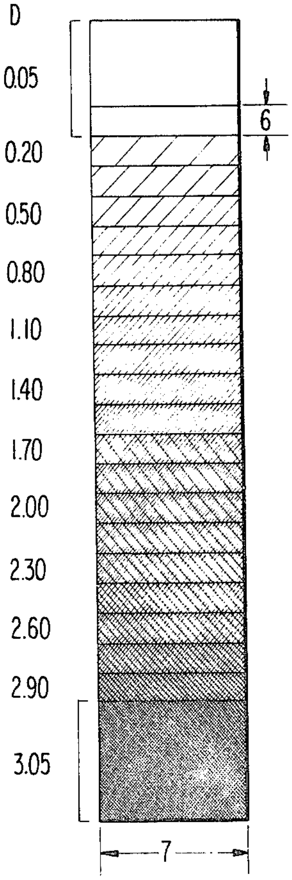
FIG. 5 is a planar view showing an embodiment of a conventional step tablet generally used at present, wherein the optical density wedge constant $\Delta d$ is 0.15.

An additional embodiment of a concentional step tablet generally used at present is shown in FIG. 5 in a planar view.

The area extent of the boundary space formed between adjacent optical density steps is particularly important when a step tablet is used for peel-apart development type photosensitive materials. The boundary space must have such an area extent that when a peel-part development type photosensitive material is subjected to a step exposure using a step wedge such as a step tablet and developed by peeling, the development is not influenced by the density step located at a subsequent position in the peeling direction. Practically speaking, the area extent of the boundary space must be such that the distance between the side edges of the adjacent optical density steps is greater than about 0.5 mm and, in the case of peel-apart development type photosensitive materials, the distance is preferably longer than about 2.0 mm although the distance differs depending upon the thickness of the photosensitive composition layer of the photosensitive material. It is theoretically preferred for the boundary space to be formed in such a manner that the one density step is completely isolated from the other density step (i.e., a distance greater than about 5 mm) for adjacent density steps but since, in practice, such an attempt is not appropriate on considering the size of the step tablet and space restrictions of step tablets, the boundary space may be formed in such a manner that the influence of the previous optical density step can be ignored from a practical standpoint in this invention.

In the negative type step tablet of this invention, specific examples of the boundary space of a specific optical density formed between adjacent optical density steps may be those having a sufficient density for light shielding the actinic radiation applied to photosensitive materials (i.e., those non-transparent to actinic radiation). By setting the optical density of the boundary space to the maximum optical density of the step tablet, the tablet may be used for any purposes and is sufficient for any purposes. However, the optical density of the boundary space can be set higher than the maximum optical density of the step tablet by using a light-shielding tape, by printing with a light-shielding ink, etc., and this case is preferred.

The above procedures can also be used for the positive type step tablet of this invention. That is, in the case of a positive type step tablet, a transparent portion (i.e., a portion transparent to actinic radiation) is formed between adjacent optical density steps as a boundary space of a specific density. The optical density of the transparent portion is usually the minimum optical density, i.e., the sum of the optical density of fog and the optical density of the transparent support but to increase the transparency of the boundary space, the optical density of that portion can be less than the minimum optical density of the step tablet by bleaching only the boundary space portion, by scraping off the photographic emulsion layer only at the boundary portion, by scraping off a part of the base at the boundary portion, etc., and such an approach is preferred.

The step tablets of this invention described above are particularly useful for peel-apart development type photosensitive materials but can also be suitably used as a step wedge for providing a step exposure on exposure testing for silver salt photographic materials conventionally used, photoresists of the solution development (wet development) type, general presensitized plates, etc.

Therefore, since the step tablets of this invention can, as a matter of course, be used for the determination of the degree of exposure of well known phtosensitive resins of the wet development type and silver salt photographic materials as well as can be suitably used for the determination of the degree of exposure of peel-apart development type photosensitive materials for the dry development system, the step tablets of this invention can be said to be step tablets which are usable in general and usable for many purposes.

The method of making the step tablets of this invention and the materials suitable for use in making the step tablets of this invention are described below.

The features of the step tablet of this invention are the distance between the adjacent optical density steps and the shape of each density step. Therefore, the preparation method and the materials for preparing may be same as those for conventional step tablets (also called "grey light wedges", "light absorbing tablets", "graded neutral-tint wedges", and "grey density scale filters") from the standpoint of making the stepwise density changes on a support.

For making the density changes stepwise, a photographic method can generally be used. That is, a step tablet having a density which changes in a stepwise manner can be prepared by exposing, with an exposure which varies in a stepwise manner, the photosensitive layer of a photographic plate or photographic film having a silver halide photographic emulsion layer (photosensitive layer) in one direction followed by a uniform development of the photosensitive layer. In this case, it is preferred to use a photographic material in which the exposure amount is linearly related to the optical density after development. Thus, after pre-determining the above-described linear relationship, the photographic material is exposed while controlling the exposure amount so that the density distortion of the low exposure portions is corrected, and an appropriate development processing is performed using a developer in such manner that development mottle is not formed. Since, once the exposure condition is initially determined, the same result is obtained so long as the same kind of photographic materials are processed under the same development conditions, the step tablets can be prepared easily and at low cost by utilizing the advantage of photographic reproduction.

Other examples of such step tablets, include density plates prepared by utilizing a printing method, such as, for example, a paper-scale density plate, a piled-up type density plate, a casting type density plate, a metal coating deposited grey density plate, a glass grey density plate, etc.

The printing method is employed in the following manner. A printing ink is poured in a mold made of an alloy plate and the ink is then transferred onto the surface of a glass plate to provide a square-shaped screen having different optical densities on the glass plate.

A paper-scale density plate can be prepared by laminating a translucent paper e.g., having a light transmittance of about 30 to 60%, such as, for example, a paraffin paper. A casting type density plate can be prepared by forming an aqueous solution of a concentration of about 10% by weight of colorless transparent gelatin under heating, mixing the solution with a non-selective light absorbent e.g., a light absorbent which can absorb visible light of any wavelength, pouring the mixture in a wedge-like or step-like mold, and cooling the mixture. In this case, a mold made of a dimensionally stable metal is required. Many casting type density plates can be reproduced using the metallic mold and casting type density plates prepared using such a method are commercially available. Suitable light absorbents which can be used for preparing a casting type density plate include graphite powder, silver black (a colloid of silver as the main component), ultrasonic wave-treated developed silver, etc.

Also, a metal coating deposited type grey density plate can be prepared by vacuum depositing a metal onto a transparent support and in this case, for improving the non-selective absorption of light, a combination of two or more metals having appropriate spectral abosrption properties can be used. A glass grey density plate can be prepared by polishing a non-selective light-absorbing black glass in a wedge form to provide a light wedge type density plate. A piled-up type density plate can be prepared by mixing a film-forming material such as collodion, etc., with a light abosrbent, uniformly coating the mixture on a flat glass to form a collodion film having a uniform density, measuring the density, and after cutting it into a suitable size, placing it on a transparent support such as a glass plate, etc.

The materials which can be used to produce the step tablet of this invention are explained in detail below.

The support used for the step tablet must have the properties of good light transmission to actinic radiation, a uniform surface state, and a uniform thickness.

Considering workability on use of the step tablet, the handling properties of the step tablet, and the vacuum adhesion of the support on preparation of the step tablet, a flexible support material is better than a rigid support such as a glass plate.

Specific examples of suitable supports which can be used in this invention are glasses such as soda lime glass, quartz glass, potash lime glass, lead glass, etc.; synthetic resins such as polyethylene terephthalate, polypropylene, polyethylene, cellulose triacetate, cellulose diacetate, cellulose acetate butyrate, cellulose acetate propyonate, polyvinyl chloride, polyvinyl alcohol, polycarbonates, polystyrene, regenerated cellulose, polyvinylidene chloride copolymers, polyamides, polyimides, vinyl acetate-vinyl chloride copolymers, polytetrafluoroethylene, polytrifluoroethylene, etc.; papers laminated with the synthetic resins as mentioned above; and papers. Furthermore, laminated materials composed of two or more of the materials described above may be used.

The thickness of the support used for the purpose is generally from about 10 μm to about 1 mm, preferably from 20 μm to 500 μm, but supports having other thickness than within the above range may also be used.

The term "actinic radiation" as employed herein means electromagnetic waves having a wave length in the region of from about 200 nm to about 700 nm, that is, means light from the near ultraviolet region to the visible region. The term "transparent to actinic radiation" means that more than about 65%, preferably more than about 75% of actinic radiation is passed or transmitted and the term "non-transparent to actinic radiation" means that less than about 3%, preferably less than about 1.5%, of actinic radiation is passed or transmitted.

The layer of the light shielding material formed on the support as described above must have a thickness such that the ultimately formed light shielding layer can exhibit the desired function, and the thickness of the layer generally ranges from about 1 μm to about 100 μm.

In the step tablet of this invention, a protective layer or a protective film may, if desired, be formed on the above-described layer of the light shielding material. The material used for the protective layer or film may be selected from the above-described materials for making the support of the step tablet of this invention and the thickness of the protective layer or film generally ranges from about 5 μm to about 100 μm, preferably from 10 μm to 50 μm.

If the gap of the space formed between the adjacent optical density steps of the step tablet of this invention is sufficient, the shape and pattern of each optical density step scarcely causes any problems or difficulties relative to the determination of the correct degree of exposure and "the influence of other optical density steps", which is, however, a difficulty in the case of using peel-apart development type photosensitive materials and conventional techniques, can be ignored. However, since, in practice, there is a restriction on the size of the step tablet, it is preferred to plan and arrange a definite number of optical density steps in a defined area.

The pattern or the shape of each optical density step is generally a rectangle but other patterns such as a circle, an ellipse, etc., may be used in this invention. In using the step tablet for determining the degree of exposure of peel-apart development type photosensitive materials, it is prefered to use a circular pattern to reduce the influence of the peeling direction to as low a level as possible.

Specific examples of the step tablets of this invention having such patterns are illustrated in FIG. 6 to FIG. 10.

Figure 10:
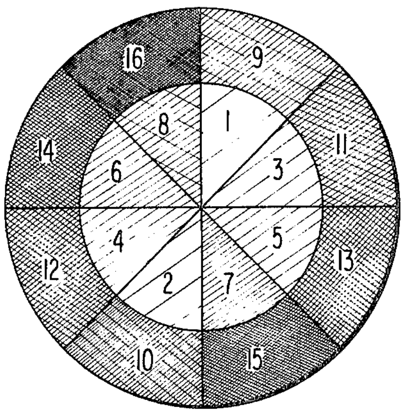
FIG. 10 is a step tablet wherein the optical density steps are oriented in an irregular manner.
Figure 9:
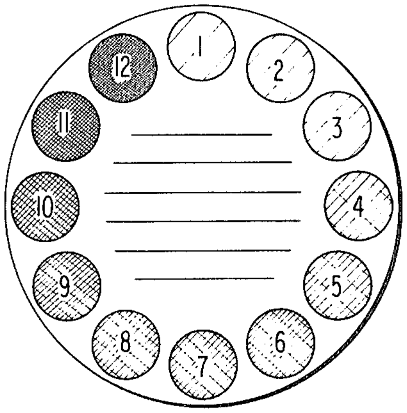
FIG. 9 is a step tablet wherein the optical density steps are oriented in a circular manner.

The optical density steps do not need necessarily to be arranged in a regular order as 0.15, 0.30, 0.45, etc. It is rather undesirable to dispose the optical density steps having close densities close to each other since in such a case, the adhesion is influenced at the peel-apart development. Therefore, density steps each having a different optical density may be arranged in an irregular manner as shown in FIG. 10.

The step tablet of this invention is further explained in more detail by reference to the following examples. Unless otherwise indicated herein, all parts, percents, ratios and the like are by weight.

EXAMPLE 1

A Photographic Step Tablet No. 3, a step tablet made by Eastman Kodak Co. having the form as shown in Table 5 (the number of steps was 21; the optical density difference was 0.15, the width 6 (in FIG. 5) of each density step was 10.16 mm, and the width 7 (in FIG. 5) of the wedge was 35 mm) was used.

Figure 6:
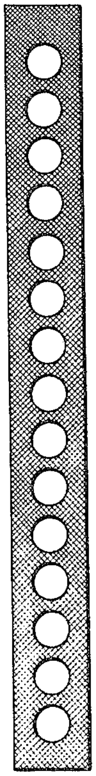
FIG. 6 is a light shielding mask composed of a black paper having circular apertures to be applied to a conventional step tablet for practicing this invention.

On the other hand, a light shielding mask having the form as shown in FIG. 6 was prepared by forming 21 circular apertures each having a diameter of 8 mm with an interval of 10.16 mm using a black paper strip.

A step tablet of this invention was prepared by adhering the light shielding mask on Photographic Step Tablet No. 3 in such a manner that the boundary portion of the adjacent density steps of the step tablet was covered by the non-apetured portion of the black paper and each density step was position under the apertured portion of the black paper.

In using the step tablet of this invention thus prepared for peel-apart development type photosensitive materials, it was found to be effective for negative working photosensitive materials.

EXAMPLE 2

A negative working type step tablet of this invention was prepared by adhering a black paper strip having circular apertures, each with a diameter of 4 mm, on a Fuji PS Step Guide (made by Fuji Photo Film Co., Ltd.) (the number of density steps was 15; the optical density difference was 0.15; the width of each density step was 6.96 mm; and the width of the wedge was 15 mm) in the manner as described in Example 1.

Furthermore, a commercially available continous gradation photosensitive film, Fuji Photogravure Film Type C PT-175 (a trade name, made by Fuji Photo Film Co., Ltd.) was vacuum adhered on the black paper mask-carrying step guide and exposed for 31 seconds to light from a tungsten lamp of 40 watts at 62 volts using a Contact Printer Type P4-AF (made by Kitamura Shashin Seihan Yohin Seizo K.K.). Furthermore, to facilitate the discrimination of the step number of each optical density step, the step numbers were printed adjacent the corresponding optical density steps with the lower numbers corresponding to the density steps of lower optical densities and then the photogravure film was developed.

The development was performed by a tray development and the developer having the composition below was used. After developing for 4 minutes while controlling the temperature of the developer to 20° C.±0.5° C., the film was immersed in a stop solution having the composition shown below for 30 seconds at 18° C. with stirring.

The film was fixed in a fix solution having the composition shown below for 12 minutes and after being washed with running water for 10 minutes, the film was immersed in an aqueous solution of about 1% Driwel (wetting agent; trade name produced by Fuji Photo Film Co., Ltd.) a water cleaning agent (surface active agent) followed by natural drying. The optical density of each step of the film thus developed was measured using a Fuji Densitometer Model B. The results of the density measurement are shown in Table 1 below.

Table 1

| | Step No | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Optical density of step | 0.09 | 0.17 | 0.31 | 0.46 | 0.61 | 0.74 | 0.89 | 1.06 | 1.22 | 1.34 | 1.49 | 1.68 | 1.83 | 1.97 | 2.10 |

The step tablet of the invention prepared as described above was effective for positive working peel-apart development type photosensitive materials.

| Developer Composition | |
|---|---|
| Water (about 50° C.) | 500 ml |
| Monomethylaminophenol Sulfate | 2.5 g |
| Sodium Sulfite (anhydrous) | 30 g |
| Hydroquinone | 2.5 g |
| Kodalc (a trade name of a material composed of borax and sodium hydroxide made by Eastman Kodak Co., thus comprising a mixture of borates mainly composed of sodium metaborate) | 10 g |
| Potassium Bromide | 0.5 g |
| Water to make (total volume) | 1000 ml |

The developer used in the above processing was prepared as follows: The components described above were added one by one in the above-described order to water maintained at about 50° C., that is, one component was first added to water with stirring and after it was completely dissolved, the next component was added thereto with stirring. When, all of the components were dissolved, cold water was added to make the total volume as described above.

| Development Stop Solution Composition | |
|---|---|
| Water | 1000 ml |
| Glacial Acetic Acid | 35 ml |

| Acid Hardening Fix Solution Composition | |
|---|---|
| Water | 600 ml |
| Ammonium Thiosulfate | 240 g |
| Sodium Sulfite (anhydrous) | 15 g |
| Glacial Acetic Acid | 13.4 ml |
| Boric Acid | 7.5 g |
| Powdered Potassium Alum | 15 g |
| Water to make (total volume) | 1000 ml |

EXAMPLE 3

Figure 7:
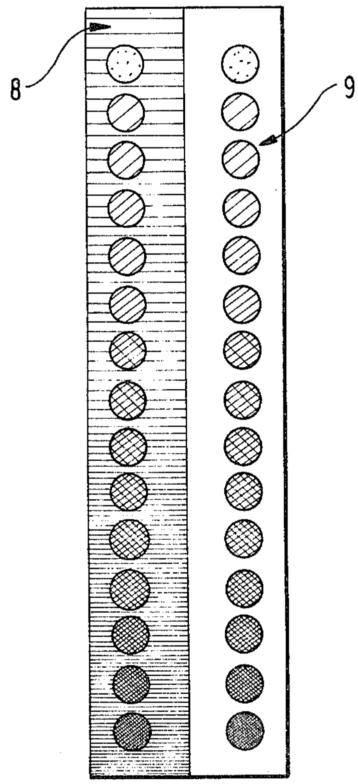
FIG. 7 is a step tablet which can be used as a negative step tablet and a positive step tablet for peel-apart development type photosensitive materials.

A step tablet was prepared by juxtaposing the negative working step tablet prepared as in Example 1 and the positive working step tablet prepared as in Example 2. Thus, a step tablet of this invention having the form as shown in FIG. 7 usable for both negative working and positive working peel-apart development type photosensitive materials was obtained. This step tablet could be suitably used for the determination of the degree of exposure of negative working peel-apart development type photosensitive materials and positive working peel-apart development type photosensitive materials.

EXAMPLE 4

The periphery of each density step of a reflection optical density plate, Kodak Paper Gray Scale, 14-inch size, made by Eastman Kodak Co. (the number of steps was 10; the reflection optical densities were 0.00, 0.10, 0.20, 0.30, 0.50, 0.70, 1.00, 1.30, 1.60, and 1.90 from the lower density to the higher density; the width of each density step was 36 mm, and the width of the wedge was 33 mm) was covered by a black paper having a reflection optical density of higher than 2.0. The density plate was mounted in a plate-making process camera as a reflection original and exposed onto a Photogravure Film Type C as described in Example 2.

The illumination of the original was performed using light from four tungsten lamps of 500 watts and the original was exposed for 28 seconds at f/16. In this case, the photographic magnification was ½. The film thus printed was developed as described in Example 2 and after drying the film, the film was contact-printed onto a photogravure film again using it as a negative. The printed film was developed and dried to provide a transmission type step tablet of this invention corresponding to the paper gray scale.

EXAMPLE 5

Figure 8:
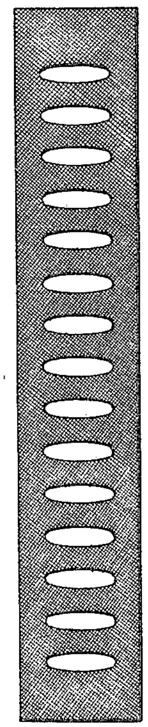
FIG. 8 is a light shielding mask having oval apertures.

Fifteen elliptical apertures (long axis 10 mm and short axis 5 mm) were formed in a black paper as shown in FIG. 8 and Fugi ND filters (Neutral Density filters) having optical densities of 0.10, 0.20, 0.30, 0.40, 0.50, 0.60, 0.70, 0.80, 0.90, 1.00, 1.10, 1.20, 1.30, 1.40, and 1.50 respectively were affixed to the apertured potions of the black paper successively to provide a step tablet of this invention having a density step difference of 0.10. Furthermore, by photographically reversing the step tablet, a step tablet having a transparent boundary space between the adjacent steps was prepared.

EXAMPLE 6

A lithographic aluminum plate made of an aluminum-base alloy containing 1.2% Mn was immersed in an aqueous solution of 5% sodium tertiary phosphate for 5 minutes at 70° C. for removing oil adhered on the surface thereof at rolling. This treatment caused etching to some extent and increased the waterretention property. After washing the aluminum plate with water, the plate was immersed in an aqueous 70% nitric acid solution, washed with water well, grained with carborundum, and then washed with water.

The aluminum plate was anodically oxidized for 2 minutes in an aqueous 20% sulfuric acid solution at 50° C. at a current density of 3 amperes/dm$^2$, washed with water, dried, and then immersed for 2 minutes in an aqueous 1% phosphoric acid solution heated to 70° C. After washing the plate with water, 1.0% aqueous solution of polyvinyl pyrrolidone K-30 (produced by Tokyo Kasei Kogyo K.K.; average molecular weight 4,000) was coated on the plate using a whirler followed by drying.

On the other hand, a solution of a photosensitive composition was prepared by dissolving the following components in 100 ml of toluene.

| | |
|---|---|
| Chlorinated Polyethylene (Superchlon CPE-907LTA*, made by Sanyo Kokusaku Pulp K.K.) | 10 g |
| Pentaerythritol Trimetharylate | 10 g |
| 2-Methylanthraquinone | 0.2 g |
| Hydroquinone | 0.1 g |
| Copper Phthalocyanine Dye | 0.2 g |

*Superchlon CPE-907LTA is a chlorinated polyethylene having a viscosity in a 40% by weight toluene solution at 25° C. of about 90 cps and containing more than 66% by weight chlorine.

The above-described solution was coated on a polyethylene terephthalate film of a thickness of 25 μm and dried for 10 minutes at 80° C. The thickness of the photosensitive layer after drying was 4 μm. Then, the photosensitive film was laminated under pressure on the aluminum plate which was subjected to the surface treatment and coated with the hydrophilic polymer as described above. On the peel-apart development type presensitized lithographic plate thus obtained were aligned in a row the step tablet of this invention (negative type, density difference between the density steps 0.15; having 15 steps; the width of the space between the adjacent steps (the distance a shown in FIG. 4) 1.5 mm) and a conventional Fuji PS Step Guide (density difference between the adjacent density steps 0.15; having 15 density steps) (a trade name, made by Fuji Photo Film Co., Ltd.) and then the presensitized plate was exposed using a PS Light S Type (a metal halide lamp of 2 kW, made by Fuji Photo Film Co., Ltd.) for 17 seconds at a distance of 1 meter. Then, the polyethylene terephthalate film was separated by peeling immediately, whereby the following result was obtained.

In this case, the direction of peeling the polyethylene terephthalate to the position of the step tablet as shown in FIG. 4 is as follows:

Direction A: Peeling the film in the direction from the lower density side to the higher density side of the step tablet.

Direction B: Peeling the film in the direction from the higher density side to the lower density side of the step tablet (opposite direction to Direction A).

Direction C: Peeling the film in the direction from the side perpendicular to the lengthwise direction of the step tablet.

Direction D: The opposite direction to Direction C.

The results obtained were as follows:

| | | | Peeling Direction | | | |
|---|---|---|---|---|---|---|
| | (I) | (II) | A | B | C | D |
| Conventional Step Tablet | Bad | Bad | 7–8th steps | 6th step | 6–7th steps | 6–7th steps |
| Step Tablet of the Invention | Good | Good | 6th step | 6th step | 6th step | 6th step |

(I) Ability to determine the step of a solid black image.
(II) Reproducibility on repeating.

As is clear from the results shown in the above table, where the peeling direction is Direction A, it is ambiguous whether the all-over collapse occured from the 7th density step and whether the all-over collapse occured at the position of the 8th density step with the conventional step tablet. Hence, it is difficult using such a conventional step tablet to determine the degree of exposure for providing optimum exposure. Also, in using the conventional step tablet, the number of the step or steps of all-over exposure changes depending on the direction of peeling the polyethylene terephthalate film. It is also difficult to determine the exact number of the density step for providing the optimum exposure from this point. Furthermore, the conventional step exposure showed poor reproducibility on repeating.

On the other hand, in using the step tablet of this invention, the number of the step providing optimum exposure could be easily determined and in using the step tablet of this invention the number of the step for providing the optimum exposure did not vary, was not influenced by the direction of peeling and also showed good reproducibility on repeating.

EXAMPLE 7

The feature of this invention is in the point that a boundary space is formed between the adjacent optical density steps of the step tablet and in this example, the extent of the width of the boundary space for the step tablet capable of being effectively used for peel-apart development type photosensitive materials was evaluated.

As peel-apart development type photosensitive materials, the peel-apart development type photosensitive lighographic plate as described in Example 6 was used. Step tablets as shown in FIG. 4 having various widths a for the boundary spaces formed between the adjacent steps were prepared and after carrying out printing using the conditions as described in Example 6, peel-apart development was performed. The results obtained are shown in Table 2 below.

Table 2

| | | Number of Printed Step for All-over Exposure | | | | | | | |
|---|---|---|---|---|---|---|---|---|---|
| Run No. | Distance a | Repeating Test 1 | 2 | 3 | 4 | 5 | 6 | 7 | Mean Number of Steps for Optimum Exposure |
| I | None(0 mm) | 7–8th steps | 7–8th steps | 7th step | 6–7th steps | 7th step | 7–8th steps | 8th step | 7.2 steps |
| II | 0.05 mm | 7th step | 6–7th steps | 7th step | 7–8th steps | 7th step | 6–7th steps | 7–8th steps | 7.0 step |
| III | 0.1 mm | 6–7th steps | 6–7th steps | 7th step | 6–7th steps | 6th step | 6–7th steps | 6–7th steps | 6.5 steps |
| IV | 0.5 mm | 6–7th steps | 6th step | 6th step | 6th step | 6–7th steps | 6th step | 6–7th steps | 6.2 steps |
| V | 1.0 mm | 6th step | 6th step | 6th step | 6–7th steps | 6th step | 6th step | 6–7th steps | 6.1 steps |
| VI | 2.0 mm | 6th step | 6th step | 6th step | 6th step | 6th step | 6th step | 6th step | 6.0 step |
| VII | 5 mm | 6th step | 6th step | 6th step | 6th step | 6th step | 6th step | 6th step | 6.0 step |

The expression "6–7th" and "7–8th" was used since the number of the step for optimum exposure could not be established with certianty. The mean value of the step number was calculated by employing the middle value as 6–7th=6.5, 7–8th=7.5 for the sake of convenience.

From the above results, it is clear that since the conventional step tablet corresponding to step tablet No. 1 shown in the Table 2 above gave, on the average, 1.2 steps in excess of the number of the step for optimum exposure as compared with the 6th step which was considered to be the proper number of the step providing the optimum exposure, the determination of the degree of exposure becomes inaccurate. Also since the reproducibility on repeating varies greatly, it is difficult to determine the step number of the step providing the optimum degree of exposure. On the other hand, the dispersion of the degree of exposure becomes less and the determination of the degree of exposure becomes more accurate as the width a of the boundary space increases in the case of this invention. From the above result, the value of the width a must be larger than 0.5 mm, preferably larger than 2.0 mm.

In addition, it can be seen that since the result shown in Table 2 is for a peel-apart development type photosensitive lithographic plate as described in Example 6, the values shown in the table may possibly change if the thickness of the photosensitive layer, etc., changes.

EXAMPLE 8

On Kodak Polymatic Lithoplate LN (a trade name for a presensitized plate, made by Eastman Kodak Co.) were closely placed in a row the step tablet of this invention (negative type or positive type) as shown in the following table and a Fuji Film PS Step Guide conventionally used and the lithographic plate was exposed for 20 seconds using PS Light S Type (metal halide lamp of 2 kW, made by Fuji Photo Film Co.) at a distance of 1 meter and subjected to a standard development. The results obtained are shown in the following table.

| Step Tablet | Type | (A) | (B) | (C) |
|---|---|---|---|---|
| Step Tablet of the Invention | Negative | 0.15 (15 steps) | 0.2 mm | 6th step |
| Step Tablet of the Invention | Positive | 0.15 (15 steps) | 0.2 mm | 6th step |
| Conventional Step Tablet | | 0.15 (15 steps) | None | 6th step |

(A) Density difference between the optical density steps.
(B) Width of the opaque space (width a in FIG. 4).
(C) Number of portion which appeared as a black image on the presensitized plate.

The results show that the step tablets of this invention could be also used for general or conventional presensitized plates as in the case of using the conventional step tablet.

EXAMPLE 9

| | |
|---|---|
| Chlorinated Polyethylene (Super chlon CPE-907LTA, made by Sanyo Kokusaku Pulp K.K.)* | 10 g |
| Pentaerythritol Dimethacrylate | 10 g |
| 2-Methylanthraquinone | 0.2 g |
| Hydroquinone | 0.1 g |
| Copper Phthalocyanine Dye | 0.2 g |

*Superchlon CPE-907LTA is a chlorinated polyethylene having a viscosity in a 40% by weight toluene solution at 20° C. of higher than about 90 cps and containing more than 66% by weight chlorine.

A photosensitive solution was prepared by dissolving the above-described components in a mixture of 100 ml of methyl ethyl ketone and 20 ml of dimethylformamide. A part of the solution was coated on a polyethylene terephthalate film of a thickness of 25 μm using a coating rod and dried for 20 minutes at 80° C. The thickness of the coating after drying was 15 μm. Then, the film thus having the photosensitive layer was laminated under pressure on a copper base plate for a printed circuit which had been cleaned.

On the surface of the laminate thus prepared were placed a negative original having a wiring pattern thereon and the two kinds of step tablets as in Example 1 around the negative original and then the photosensitive layer was exposed for 60 seconds using a Jet Printer of 2 kW (high-pressure mercury lamp), made by Oak Seisakusho K.K. at a distance of 70 cm. Then, the polyethylene terephthalate film was immediately separated by peeling, whereby light-hardened positive images were formed on the copper plate and unhardened portions were removed together with the polyethylene terephthalate film.

On the other hand, the images of the step tablets formed around the wiring patterns. In this case, the portions to which the conventional step tablet were printed were reproduced indistinctly from the 6th step to the 8th step, which results in making it difficult to establish the step number for all-over exposure. However, the portions on which the step tablet of this invention was printed were reported distinctly up to the 6th step and no polymer remained on the copper plate at the portions corresponding to the higher number of steps. Thus, the number of steps for all-over exposure could be very easily determined.

While the invention has been described in detail and with reference to specific embodiments thereof, it will be apparent to one skilled in the art that various changes and modifications can be made therein without departing from the spirit and scope thereof.

What is claimed is:

1. A step tablet with optical density steps of a definite shape, each step having a different specific optical density, disposed in a specific order, in which any two adjacent optical density steps have a boundary which is not transparent to actinic radiation and of a specific shape therebetween.

2. The tablet described in claim 1, wherein said boundary space is linear with a specific width.

3. The step tablet described in claim 1, wherein the boundary space is disposed around and completely surrounds each optical density step.

4. The step tablet described in claim 1, wherein said optical density step has a circular or elliptical shape.

5. The step tablet described in claim 1, wherein at least one of said optical density step includes an indicator mark transparent to actinic radiation.

6. The step tablet described in claim 1, wherein at least one of said optical density steps includes an indicator mark not transparent to actinic radiation.

7. The step tablet described in claim 1, wherein said optical density steps are disposed in a decrasing or increasing optical density order.

8. The step tablet described in claim 7, wherein said boundary space is linear with a specific width.

9. The step tablet described in claim 7, wherein the boundary space is disposed around and completely surrounds each optical density step.

10. The step tablet described in claim 7, wherein said optical density step has a circular or elliptical shape.

11. The step tablet described in claim 7, wherein at least one of said optical density steps includes an indicator mark transparent to actinic radiation.

12. The step tablet described in claim 7, wherein at least one of said optical density steps includes an indicator mark not transparent to actinic radiation.

13. The step tablet described in claim 7, wherein the optical density of said boundary space corresponds to the maximum optical density of said step tablet.

14. The step tablet described in claim 13, wherein at least one of said optical density steps includes an indicator mark not transparent to actinic radiation.

15. The step tablet described in claim 1, wherein said optical density steps are disposed randomly.

16. The step tablet described in claim 15, wherein said boundary space is linear with a specific width.

17. The step tablet described in claim 15, wherein the boundary space is disposed around and completely surrounds each optical density step.

18. The step tablet described in claim 15, wherein said optical density step has a circular or elliptical shape.

19. The step tablet described in claim 15, wherein at least one of said optical density steps includes an indicator mark transparent to actinic radiation.

20. The step tablet described in claim 15, wherein at least one of said optical density steps includes an indicator mark not transparent to actinic radiation.

21. The step tablet described in claim 15, wherein the optical density of said boundary space corresponds to the maximum optical density of said step tablet.

22. The step tablet described in claim 21, wherein at least one of said optical density steps includes an indicator mark not transparent to actinic radiation.

23. The step tablet described in claim 1, wherein the optical density of said boundary space corresponds to the maximum optical density of said step tablet.

24. The step tablet described in claim 23, wherein at least one of said optical density steps includes an indicator mark not transparent to actinic radiation.

25. A step tablet with optical density steps of a definite shape, each step having a different specific optical density, disposed in a specific order, in which any two adjacent optical density steps have a boundary space of a specific shape therebetween wherein said boundary space comprises a portion transparent to actinic radiation and a portion not transparent to actinic radiation and said two portions contact the same two adjacent optical density steps.

26. The step tablet described in claim 25, wherein said boundary space is linear with a specific width.

27. The step tablet described in claim 25, wherein the boundary space is disposed around and completely surrounds each optical density step.

28. The step tablet described in claim 25, wherein said optical density step has a circular or elliptical shape.

29. The step tablet described in claim 25, wherein said optical density steps are disposed in a decreasing or increasing optical density order.

30. The step tablet described in claim 29, wherein said boundary space is linear with a specific width.

31. The step tablet described in claim 29, wherein the boundary space is disposed around and completely surrounds each optical density step.

32. The step tablet described in claim 29, wherein said optical density step has a circular or elliptical shape.

33. The step tablet described in claim 25, wherein said optical density steps are disposed randomly.

34. The step tablet described in claim 33, wherein said boundary space is linear with a specific width.

35. The step tablet described in claim 33, wherein the boundary space is disposed around and completely surrounds each optical density step.

36. The step tablet described in claim 33, wherein said optical density step has a circular or elliptical shape.

* * * * *